United States Patent
Misawa et al.

(10) Patent No.: US 6,774,946 B1
(45) Date of Patent: Aug. 10, 2004

(54) BATTERY RECHARGING SYSTEM AND METHOD FOR ELECTRONIC CAMERAS

(75) Inventors: Takeshi Misawa, Asaka (JP); Akihisa Yamazaki, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/362,404

(22) Filed: Jul. 28, 1999

(30) Foreign Application Priority Data

Jul. 29, 1998 (JP) .......................................... 10-227535

(51) Int. Cl.[7] .................... H04N 5/225; H04N 5/222; H01L 27/00; G03B 7/26
(52) U.S. Cl. ............. 348/372; 348/333.07; 348/333.13; 250/208.1; 396/301
(58) Field of Search ...................... 348/208.16, 333.07, 348/333.13, 372, 373, 374, 375; 250/208.1; 396/278, 279, 280, 301, 303, 304

(56) References Cited

U.S. PATENT DOCUMENTS

| | | | | |
|---|---|---|---|---|
| 4,328,456 A | * | 5/1982 | Suzuki et al. ................ | 320/101 |
| 4,642,413 A | * | 2/1987 | Ovshinsky ................... | 136/249 |
| 5,185,565 A | * | 2/1993 | Uchida ........................ | 320/163 |
| 5,402,204 A | * | 3/1995 | Yoshimura .................. | 396/287 |
| 5,424,800 A | * | 6/1995 | Suzuki ........................ | 396/279 |
| 5,493,335 A | * | 2/1996 | Parulski et al. ........... | 348/231.6 |
| 5,689,172 A | * | 11/1997 | Koyama et al. ............. | 320/125 |
| 5,691,620 A | * | 11/1997 | Nagai et al. ................. | 320/106 |
| 5,742,044 A | * | 4/1998 | Battersby .................. | 250/208.1 |
| 6,096,969 A | * | 8/2000 | Fujita et al. ................. | 136/259 |
| 6,366,739 B1 | * | 4/2002 | Yoshihara et al. .......... | 396/304 |
| 6,459,235 B2 | * | 10/2002 | Odeohhara et al. ......... | 320/116 |

FOREIGN PATENT DOCUMENTS

| | | | | | |
|---|---|---|---|---|---|
| JP | 56008968 A | * | 1/1981 | ............ | H04N/5/30 |
| JP | 02077732 A | * | 3/1990 | ........... | G03B/7/095 |
| JP | 0300937 A | * | 1/1991 | .......... | G03G/15/00 |
| JP | 06289467 A | * | 10/1994 | ........... | G03B/17/02 |
| JP | 06303729 A | * | 10/1994 | ............ | H02J/7/02 |
| JP | 08201898 A | * | 8/1996 | ............ | G03B/17/02 |
| WO | WO 9930209 A1 | * | 6/1999 | ........... | G03B/15/05 |

* cited by examiner

*Primary Examiner*—Ngoc-Yen Vu
*Assistant Examiner*—John Villecco
(74) *Attorney, Agent, or Firm*—Birch, Stewart, Kolasch & Birch, LLP.

(57) ABSTRACT

A rechargeable battery in an electronic camera is charged without additionally providing the camera with a power generating device. When a power-supply switch of the camera is turned off, a diaphragm and a shutter are opened and a taking lens is controlled so as to set focus to infinity. Signal charge that has accumulated in a CCD is output as a charging current, and the rechargeable battery is charged by a power-supply control circuit.

21 Claims, 9 Drawing Sheets

BATTERY RECHARGING SYSTEM AND METHOD FOR ELECTRONIC CAMERAS

BACKGROUND OF THE INVENTION

1. Field of the Invention

This invention relates to an electronic camera equipped with a solid-state electronic image sensing device for sensing the image of a subject and outputting a video signal representing the image of the subject, and to a method of operating the camera.

2. Description of the Related Art

An electronic camera such as a movie-video camera and still-video camera uses a rechargeable battery as the operating power supply. In general, the rechargeable battery is placed in a charging apparatus that is separate from the electronic camera and is charged by the charging apparatus.

There are also cases where an electronic camera is provided with a power generating device such as a solar battery and the camera is charged using this device.

When a camera is additionally provided with a power generating device, however, the camera cannot be reduced in size. Solar batteries, on the other hand, are expensive and lead to higher camera cost.

SUMMARY OF THE INVENTION

Accordingly, an object of the present invention to arrange it so that a rechargeable battery can be charged without using a charging device separate from an electronic camera and without newly providing the electronic camera with a power generating device.

According to the present invention, the foregoing object is attained by providing an electronic camera equipped with a solid-state electronic image sensing device for sensing the image of a subject and outputting a video signal representing the image of the subject, comprising a power-supply switch for controlling a power supply to turn the power supply on and off; a power-supply switch discrimination device (a power-supply switch discrimination means) for determining whether the power-supply switch has been turned off; a charging circuit for charging a rechargeable battery; and a charging control device (charging control means), responsive to a determination by the power-supply switch discrimination device that the power-supply switch has been turned off, for controlling the charging circuit so as to charge the rechargeable battery using signal charge that has accumulated in the solid-state electronic image sensing device.

The present invention provides also a method of controlling the operation of the above-described electronic camera. Specifically, the invention provides a method of controlling the operation of an electronic camera equipped with a solid-state electronic image sensing device for sensing the image of a subject and outputting a video signal representing the image of the subject, comprising the steps of determining whether a power-supply switch, which is for controlling a power supply to turn the power supply on and off, has been turned off, and, in response to turning off of the power-supply switch, charging a rechargeable battery using signal charge that has accumulated in the solid-state electronic image sensing device.

In accordance with the present invention, the rechargeable battery is charged, when the power-supply switch is turned off, using signal charge that has accumulated in the solid-state electronic image sensing device that sensing the image of the subject. The various circuits in the electronic camera are driven by the rechargeable battery thus charged.

Thus, the rechargeable battery of an electronic camera can be charged without newly providing the camera with a power generating device. Since the solid-state electronic image sensing device is already provided in the electronic camera for the purpose of image sensing, the rechargeable battery can be charged without using means that would impede miniaturization of the camera.

When a diaphragm has been provided to limit the quantity of light that impinges upon the solid-state electronic image sensing device, it is preferred that the diaphragm be opened as a result of turning off the power-supply switch. This is because increasing the quantity of light that impinges upon the solid-state electronic image sensing device makes it possible to charge the rechargeable battery more efficiently.

When a mechanical shutter has been provided to limit the length of time during which light impinges upon the solid-state electronic image sensing device, it is preferred that the mechanical shutter be opened as a result of turning off the power-supply switch. This allows light to impinge upon the solid-state electronic image sensing device.

It is preferred that the electronic camera be further provided with a taking lens for forming the image of a subject on a light-receiving surface of the solid-state electronic image sensing device; a focusing mechanism for controlling the taking lens so as to focus the image of the subject on the light-receiving surface of the solid-state electronic image sensing device; and a device for controlling the focusing mechanism, in response to turning off of the power-supply switch, in such a manner that the image of the subject is formed at infinity. The reason for this is that when the rechargeable battery is charged, the light source for charging is considered to be at infinity, thereby raising the efficiency with which light is received.

In a preferred embodiment, a light-transmitting window is formed in the back side of the electronic camera, a light shielding member is made freely attachable to the window, and the underside of the solid-state electronic image sensing device is fixed to the window via a transparent substrate.

Light impinges from the underside of the solid-state electronic image sensing device via the window and signal charge accumulates in the solid-state electronic image sensing device. The efficiency with which signal charge accumulates in the solid-state electronic image sensing device is improved.

Further, it is preferred that the light shielding member be provided with a display device for displaying the image of the subject represented by the video signal output from the solid-state electronic image sensing device.

The light shielding member may be removably attached not only to the back side of the electronic camera but also to the front side of the electronic camera.

Such components as the taking lens and solid-state electronic image sensing device with which the electronic camera is provided can be protected by the light shielding member.

An arrangement may be adopted in which, when the light shielding member has been provided with the display device, the side of the light shielding member having the display device is faced to the outside or to the inside of the camera.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
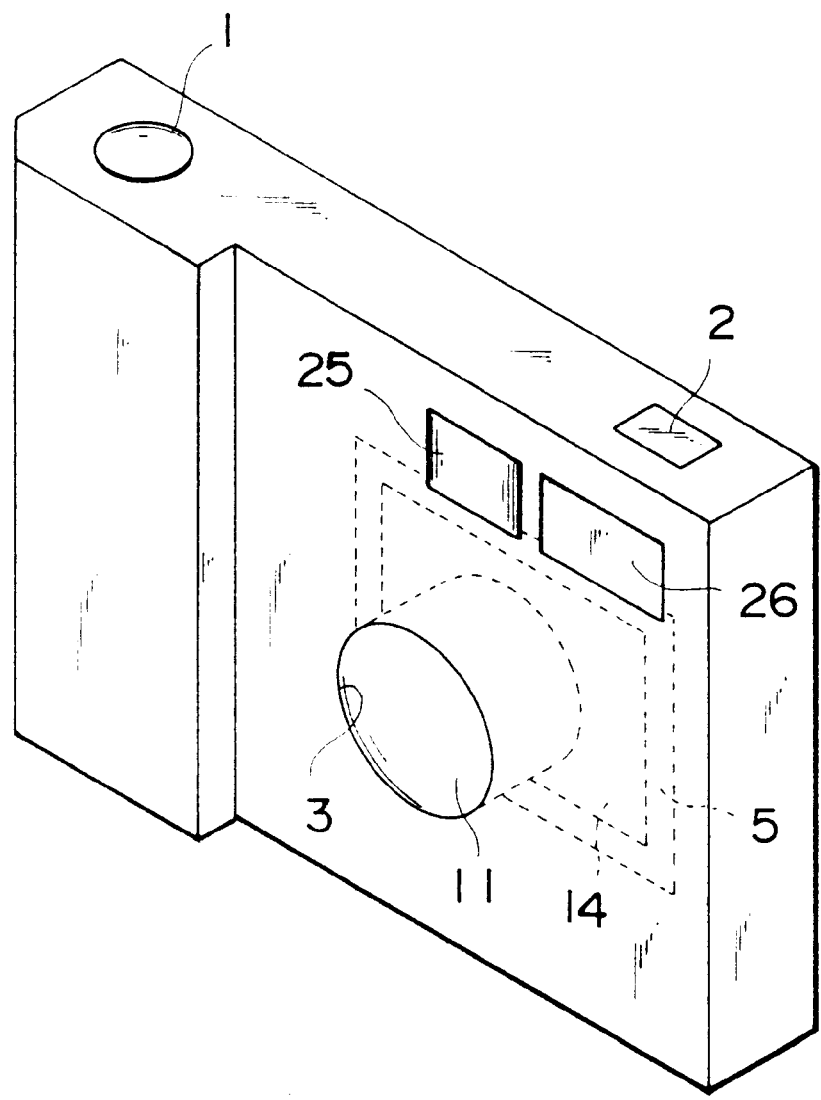
FIG. 1 is a perspective view showing the appearance of an electronic camera.

FIG. 1 is a perspective view showing the appearance of an electronic camera according to the present invention.

As shown in FIG. 1, the electronic camera has a shutter-release button 1 provided on the left end of the top side thereof and a power-supply switch 2 provided the right end of the top side thereof.

The front side of the electronic camera is formed to have an opening 3 approximately at the center thereof. A taking lens 11 is exposed from the opening 3. A CCD 14 is placed on the image forming plane of the taking lens 11 and is fixed by a substrate 5 to the back of the electronic camera on its inner side.

A viewfinder 25 is formed on the front side of the electronic camera at the upper part thereof, and an auxiliary light source 26 is formed to the right of the viewfinder 25.

Figure 2:
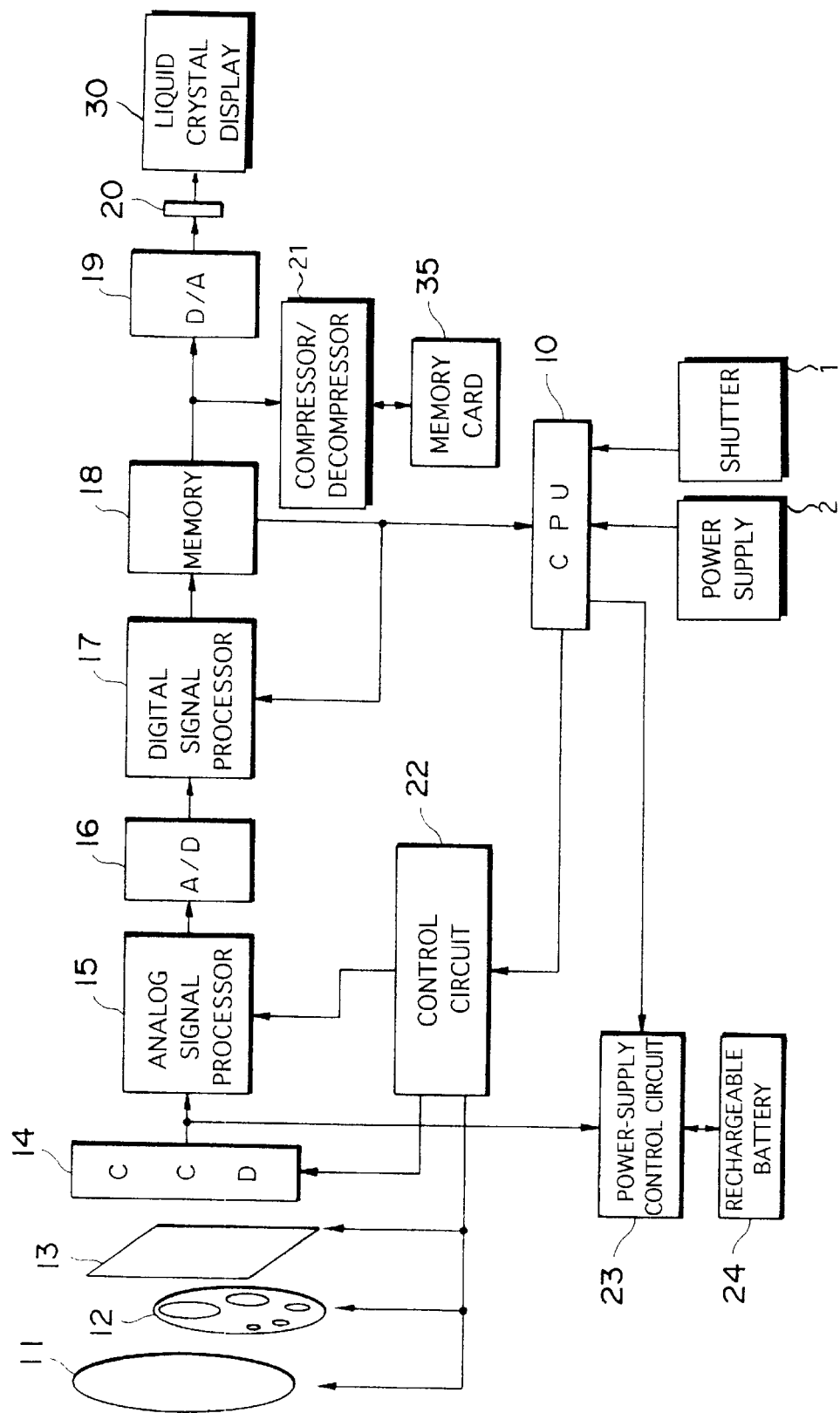
FIG. 2 is a block diagram showing the electrical construction of the electronic camera.

FIG. 2 is a block diagram showing the electrical construction of the electronic camera.

The overall operation of the electronic camera is controlled by a CPU 10. A signal indicating that the shutter-release button 1 has been pressed and a signal indicating the power on/off state of the power-supply switch 2 both enter the CPU 10.

The image of a subject is formed on the light-receiving surface of the CCD 14 by the taking lens 11. Provided between the taking lens 11 and the CCD 14 are a diaphragm 12 and a shutter 13 which limit the quantity of light that impinges upon the CCD 14.

The focusing operation of the taking lens 11, the setting of the f number of diaphragm 12, the shutter operation by the shutter 13 and the operation for reading out signal charge that has accumulated in the CCD 14 are controlled by a control circuit 22.

When the image of a subject is sensed, a video signal output by the CCD 14 enters an analog signal processing circuit 15. The video signal is subjected to a gamma correction and a white balance adjustment by the analog signal processing circuit 15. The video signal output by the analog signal processing circuit 15 is converted to digital image data by an analog/digital converting circuit 16. The digital image data obtained by the conversion is input to a digital signal processing circuit 17.

The digital image data is subjected to digital signal processing such as color separation by the digital signal processing circuit 17. The image data output by the digital signal processing circuit 17 enters a memory 18, where the data is stored temporarily.

Digital image data that has been stored temporarily in the memory 18 is read out and then compressed by a compression/decompression circuit 21. The compressed image data is stored on a memory card 35 that has been inserted into the electronic camera.

The electronic camera can be equipped with a liquid crystal display device 30 as well. To this end, the electronic camera is provided with a socket 20 for installing the liquid crystal display device 30.

The image data that has been stored temporarily in the memory 18 is read out of the memory 18 and input to a digital/analog converting circuit 19. The digital image data is converted to an analog video signal by the digital/analog converting circuit 19. The analog video signal obtained by the conversion is applied to the liquid crystal display device 30 via the socket 20, as a result of which the image of the subjected represented by the analog video signal is displayed on the liquid crystal display device 30.

The electronic camera also is capable of reproducing image data that has been recorded on the memory card 35. The image data that has been recorded on the memory card 35 is compressed image data. Compressed image data that has been read out of the memory card 35 is decompressed by the compression/decompression circuit 21. The decompressed image data is converted to an analog video signal by the digital/analog converting circuit 19, and the analog video signal is applied to the liquid crystal display device 30 via the socket 20. The image represented by compressed image data that has been recorded on the memory card 35 is displayed on the liquid crystal display device 30.

The electronic camera can also charge a rechargeable battery 24 as well as sense the image of a subject.

When the rechargeable battery 24 is charged, the signal output by the CCD 14 is input to a power-supply control circuit 23. The latter charges the rechargeable battery 24 using the signal output by the CCD 14. The details of the charging operation will be described later.

Figure 3:
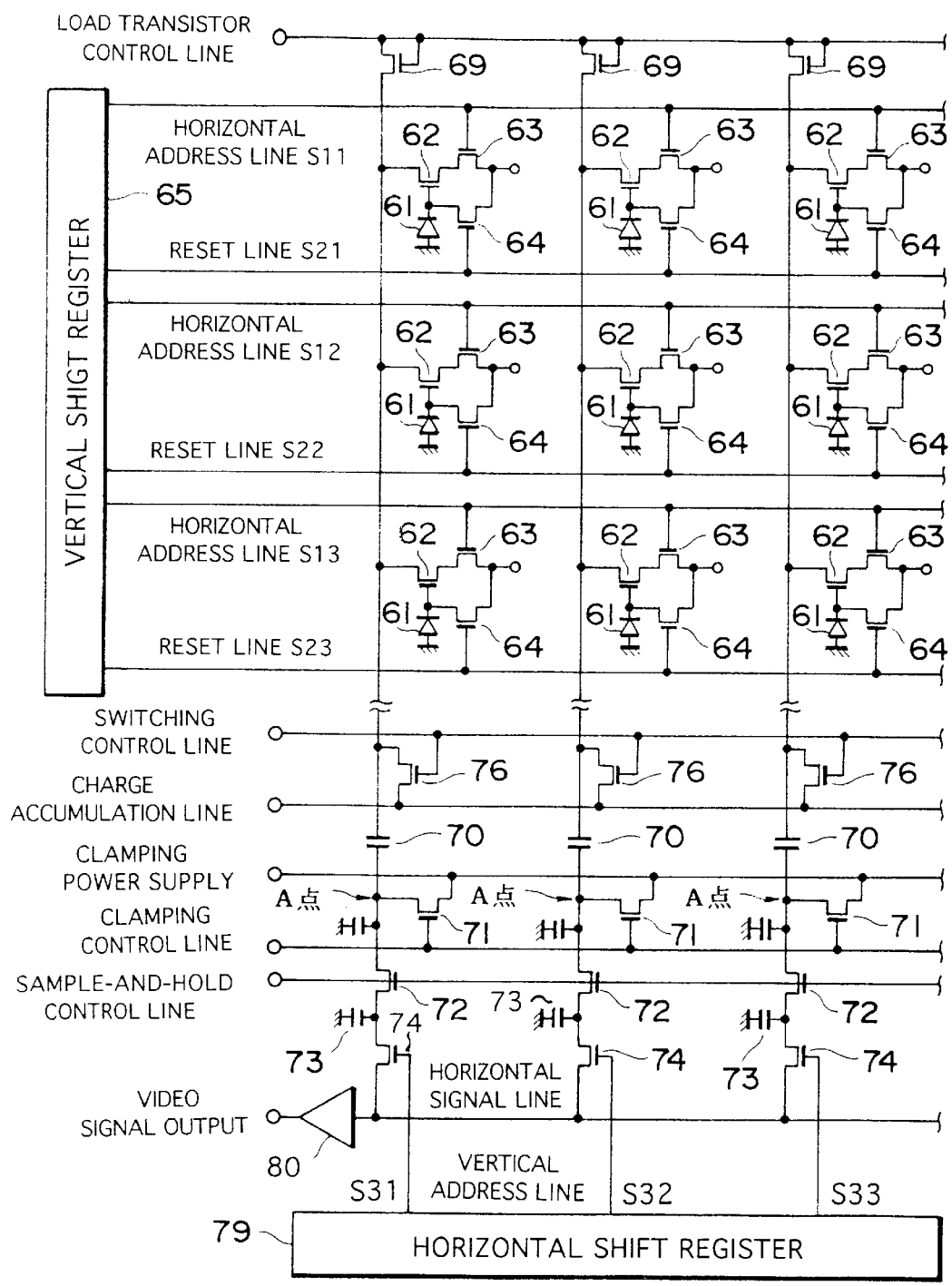
FIG. 3 is a diagram showing the structure of a charge-coupled device (CCD)
Figure 4:
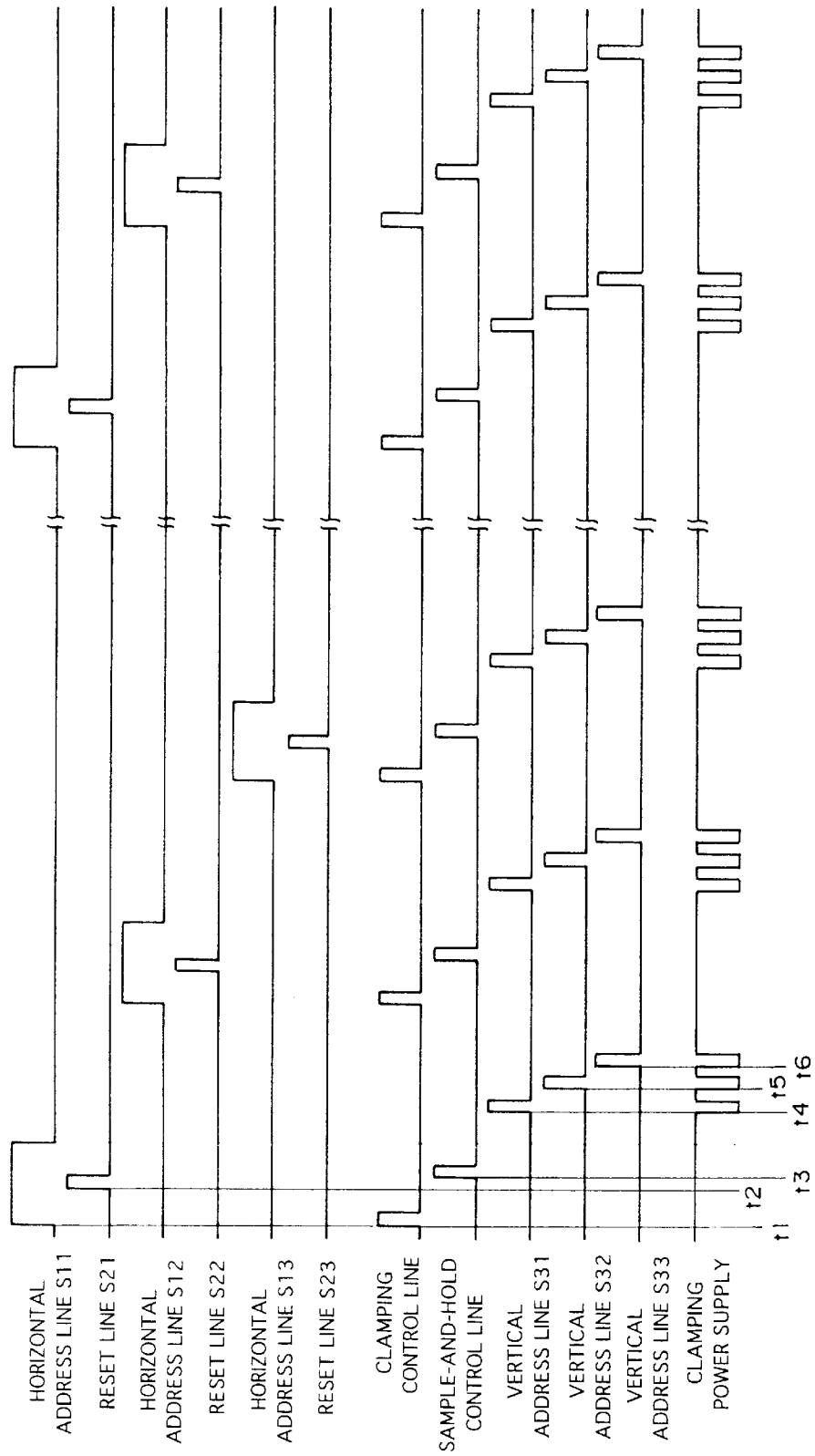
FIG. 4 is a time chart showing readout of signal charge from the CCD of FIG. 3.

FIG. 3 illustrates part of the circuit structure of the CCD 14, and FIG. 4 is a time chart useful in describing readout of signal charge that has accumulated in the CCD 14.

The CCD 14 employs amplifying-type MOS (metal oxide semiconductor) sensors.

A circuit associated with one pixel of the CCD 14 is constituted by a photodiode 61, an amplifying transistor 62, a vertical selection transistor 63 and a reset transistor 64.

Gate terminals of the vertical selection transistors 63 are connected to horizontal address lines S11 to S13 each having one end connected to a vertical shift register 65. Reset lines S21 to S23 extend from the vertical shift register 65, and gate terminals of the reset transistors 64 are connected to the reset lines S21 to S23.

Vertical address lines S31 to S33 extend from a horizontal shift register 79, and source terminals of the amplifying transistors 62 are connected to the vertical address lines. A load transistor 69 is connected to the other end of each vertical address line. A load transistor control line also is connected to the load transistors 69.

Connected to one end portion of each vertical address line is a noise elimination circuit constituted by a clamping capacitor 70, a clamping transistor 71 (the gate terminal of which is connected to a clamping control line), a sample-and-hold transistor 72 (the gate terminal of which is connected to a sample-and-hold control line), and a sample-and-hold capacitor 73. The noise elimination circuit is connected to the horizontal shift register 79 via horizontal selection transistor 74.

A horizontal signal line which outputs electric charge is connected to the horizontal selection transistors 74. The signal output by this horizontal signal line is amplified and then output by an amplifier circuit 80.

Switching transistors 76 are connected to the vertical address lines of the CCD 14. A switching control line for controlling the on/off state of the switching transistors 76 is connected to the gates terminals of the switching transistors 76. The source terminals of the switching transistors 76 are connected to the vertical address lines and their drain terminals are connected to a charge accumulation line.

Operation performed when signal charge that has accumulated in the photodiodes 62 of this CCD 14 by image sensing is read out will now be described.

When the shutter 13 is closed, a signal on the first horizontal address line S11 assumes the H (high) level and the vertical selection transistors 63 of the pixels on the first line turn on at time t1. When this occurs, voltages approximately equal to the gate voltage of amplifying transistors 62 (the voltage of photodiodes 61) develop on the vertical address lines. At this time a clamping pulse from the clamping control line is applied to the gate terminals of the clamping transistors 71 so that clamping nodes (points A in FIG. 3) take on a voltage the same as the line voltage of the clamping power supply.

At time t2, which is after the clamping pulse vanishes (i.e., is turned off), the reset lines each output a reset pulse, which is applied to the reset transistors 64. The latter are reset and, hence, the signal charge that has accumulated in the photodiodes 61 is reset. As a result, voltages are produced at each of the clamping nodes (points A). The voltage represents the difference between the voltage of the clamping capacitor 70 when signal charge has accumulated in the photodiode 61 and the voltage when the signal charge accumulated in the photodiode 61 has been reset.

Next, at time t3, a sample-and-hold pulse is output by the sample-and-hold control line and this pulse is applied to the gate terminals of the sample-and-hold transistors 72. When this occurs the sample-and-hold transistors 72 turn on, so that the signal charge that has accumulated in the clamping capacitors 70 builds up in the sample-and-hold capacitors 73.

At times t4, t5, and t6, horizontal selection pulses are output from the horizontal shift register 79 and applied to the gate terminals of the horizontal selection transistors 74 via the vertical address lines S31, S32 and S33, respectively. The signal charge that has accumulated in the photodiodes 61 is output via the amplifier circuit 80 as a video signal. The video signal is applied to the analog signal processing circuit 15.

Operation of the CCD 14 when the rechargeable battery is charged will now be described.

The vertical shift register 65 outputs an H-level readout pulse to all of the horizontal address lines, whereupon signal charge that has accumulated in all of the photodiodes 61 is output from the charge accumulation line. The signal charge that has been output from the charge accumulation line is applied to the power-supply control circuit 23.

At this time an H-level pulse is output to the load transistor control line and switching control line. The reset lines, clamping power supply, clamping control line, sample-and-hold control line and vertical address lines are all placed at the L (low) level. As a result, power consumption can be reduced and sufficient charging becomes possible.

Figure 5:
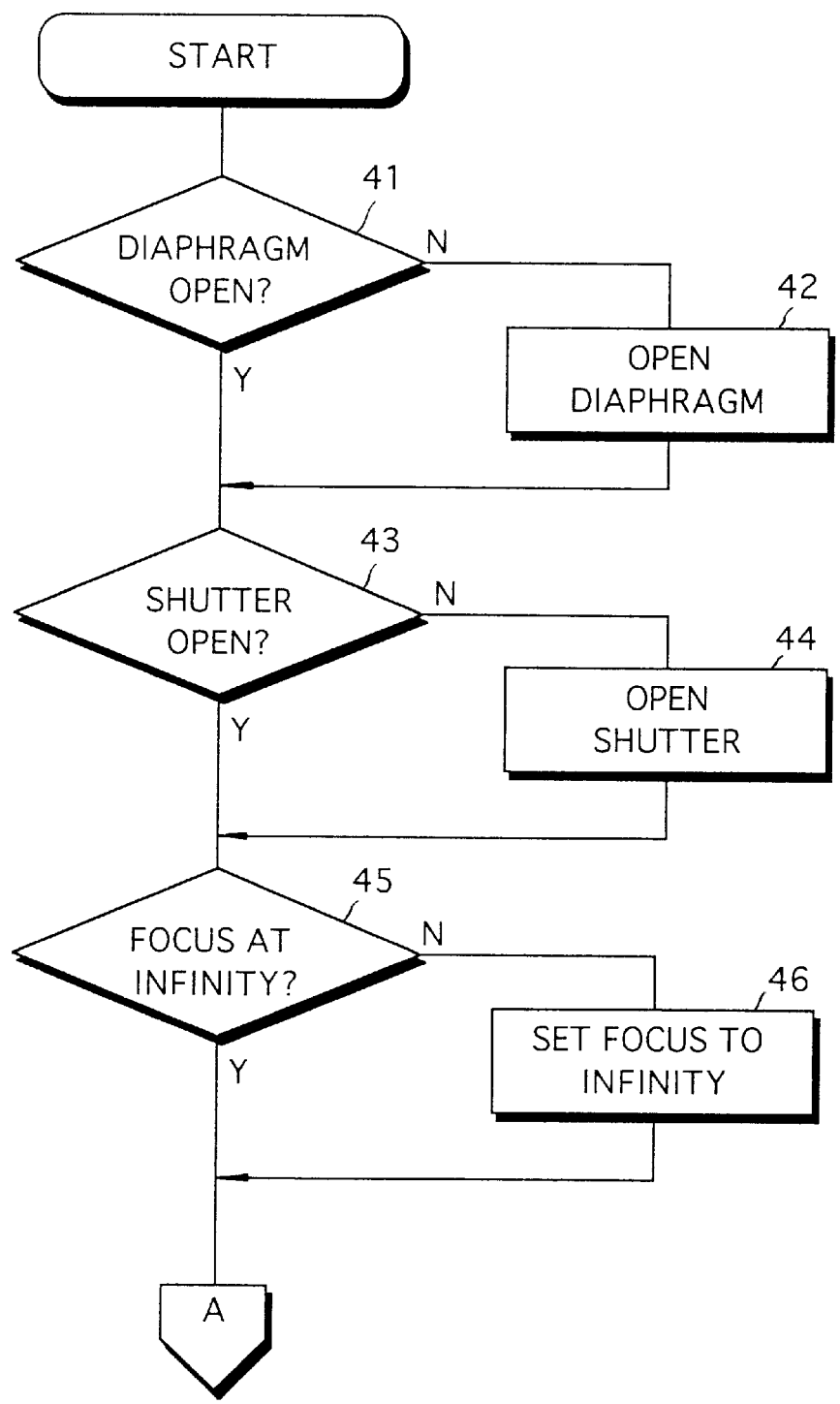
FIGS. 5 and 6 are flowcharts illustrating the procedure of processing executed in the electronic camera when a power-supply switch is turned off.
Figure 6:
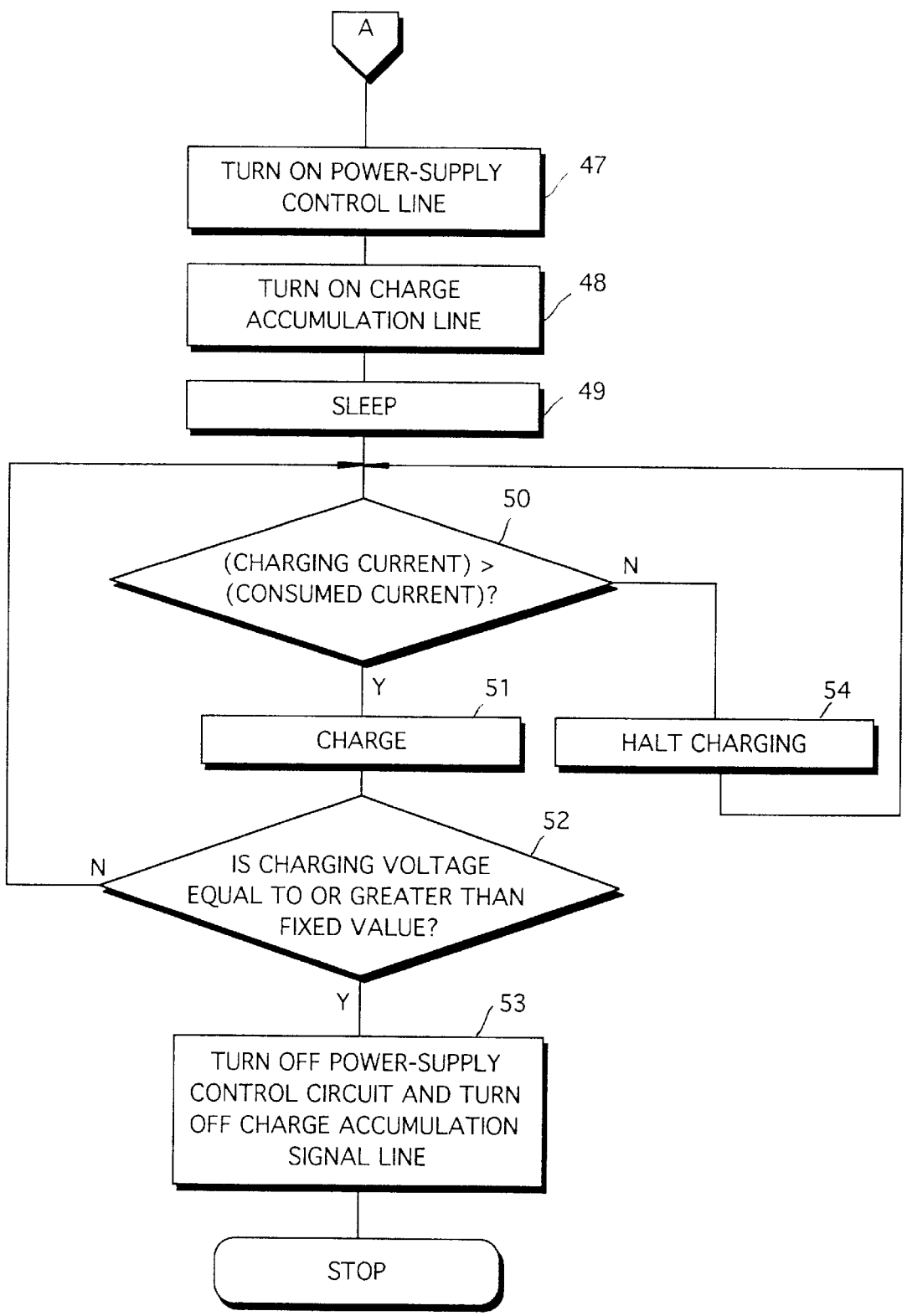

FIGS. 5 and 6 are flowcharts illustrating the procedure of processing executed when the power-supply switch 2 is turned off by the user the electronic camera.

When the power-supply switch 2 is turned off, it is determined whether the diaphragm 12 has been opened (step 41). If the diaphragm 12 has not been opened, the diaphragm 12 is opened by the control circuit 22 (step 42). Since the diaphragm 12 is opened, the amount of light that impinges upon the light-receiving surface of the CCD 14 increases. If the diaphragm 12 has already been opened, the processing of step 42 is skipped.

It is determined whether the shutter 13 has been released (step 43). If the shutter 13 has not been released, then the shutter 13 is released by the control circuit 22 (step 44). Since the shutter 13 is released, light impinges upon the light-receiving surface of the CCD 14. If the shutter 13 has already been released, then the processing of step 44 is skipped.

It is determined whether the focus of the taking lens 11 has been set to infinity (step 45). If focus has not been set to infinity, focus is controlled by the control circuit 22 so as to be set to infinity (step 46). Thus the light source for charging can be assumed to reside at infinity. The amount of light that impinges upon the CCD 14 is increased.

The power-supply control circuit 23 is turned on by the CPU 10 (step 47) and the above-mentioned charge accumulation signal line, load transistor control line and switching control line are turned on (step 48). The electronic camera is thenceforth placed in the sleep mode so that the camera circuits, with the exception of the CPU 10, control circuit 22 and power-supply control circuit 23, are turned off (step 49).

Charging current obtained from the CCD 14 and consumed current (the value of consumed current is determined in advance for each electronic camera) are compared (step 50).

If the charging current is greater than the consumed current ("YES" at step 50), the charging current output by the CCD 14 is applied to the power-supply control circuit 23 and the rechargeable battery 24 is charged by the power-supply control circuit 23 (step 51). The voltage of the rechargeable battery 24 is monitored by the power-supply control circuit 23 and charging of the rechargeable battery 24 is continued until the voltage of the battery 24 equals or exceeds a fixed value ("NO" at step 52).

If the voltage of rechargeable battery 24 equals or exceeds the fixed value ("YES" at step 52), the power-supply control circuit 23 is turned off and the output pulse of the charge accumulation signal line of the CCD 14 reverts to the L level (step 53).

If the consumed current is smaller than the charging current output by the CCD 14 ("NO" at step 50), charging is halted (step 54). The output pulse of the charge accumulation signal line of CCD 14 assumes the L level temporarily. It goes without saying that when the charging current equals or exceeds the consumed current and charging is carried out, the output pulse of the charge accumulation signal line temporarily turned off reverts to the H level.

Figure 7A:
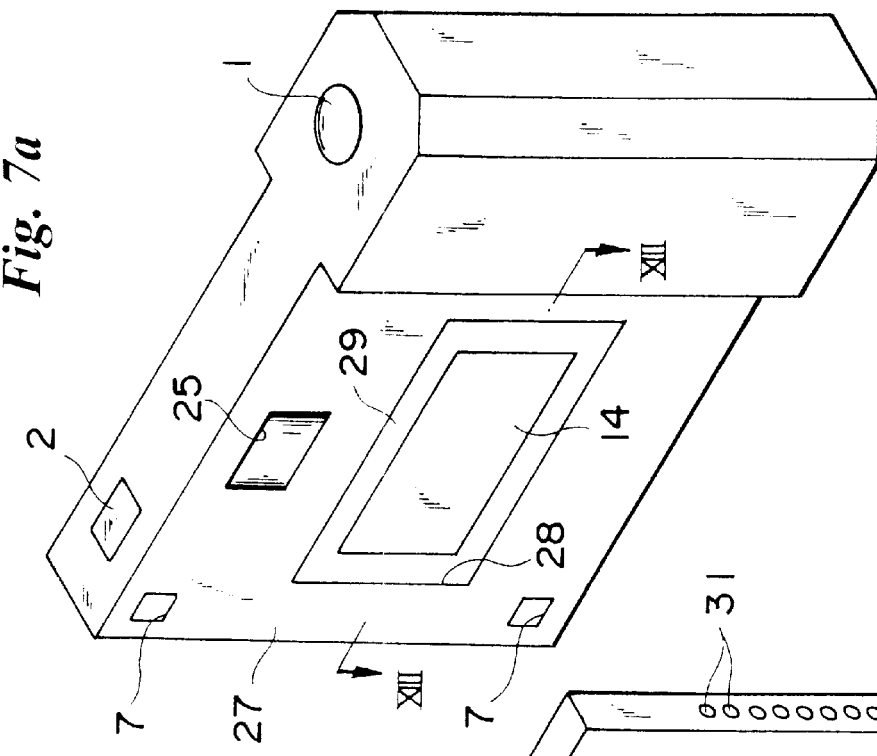
FIG. 7a is a perspective view showing the appearance of an electronic camera according to another embodiment of the present invention and FIG. 7b is a perspective view showing the appearance of a light shielding plate according to this embodiment.
Figure 7B:
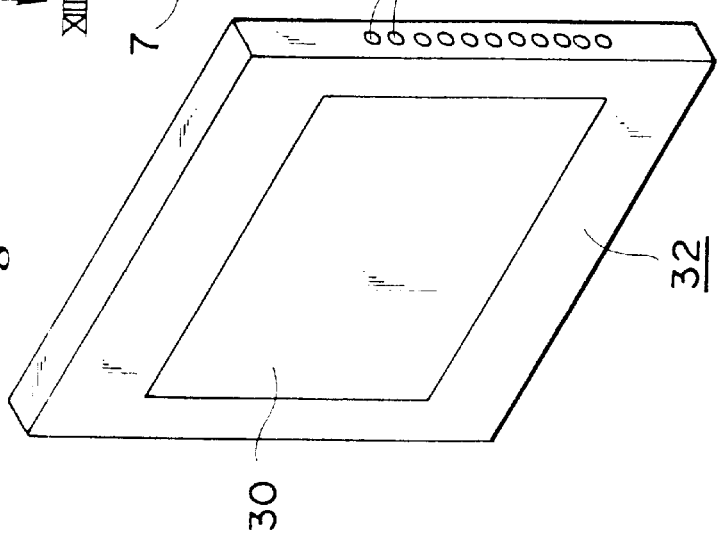
Figure 8:
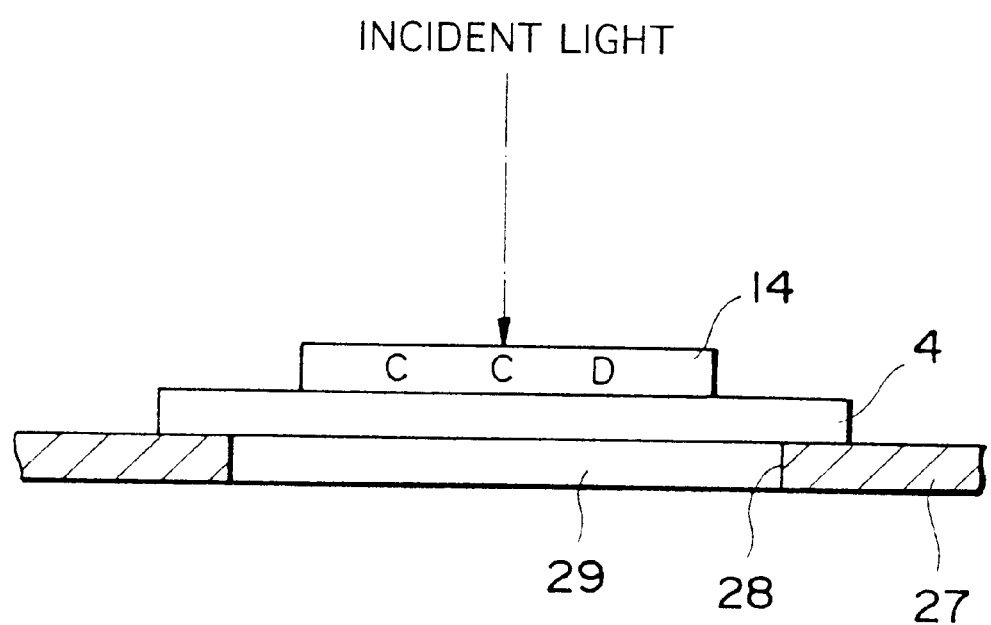
FIG. 8 is a sectional view of FIG. 7a taken along line XIII—XIII.

FIGS. 7a and 7b illustrate another embodiment of the present invention, in which FIG. 7a shows the appearance of an electronic camera as seen from the back side thereof, and FIG. 7b shows a light shielding plate 32. FIG. 8 is a sectional view of FIG. 7a taken along line XIII—XIII.

The electronic camera has a back plate 27 formed to have a window 28 into which a glass plate 29 is fitted. The CCD 14 is fixed to a transparent substrate 4, which is secured to the inner side of the back plate 27 of the electronic camera in such a manner that the underside of the CCD 14 faces the window 28.

The upper left and lower left corners of the back plate 27 of the electronic camera are formed to have recesses 7.

The display surface of a liquid crystal display device 30 is exposed at one surface (the frontward surface) of the light shielding plate 32. Terminals 31 for making an electrical connection to the electronic camera are formed along one side edge of the light shielding plate 32. Projections (not shown) are formed on the other surface (the rearward surface) of the light shielding plate 32.

If the aforesaid other surface of the light shielding plate 32 is registered with the back plate 27 of the electronic camera, the projections on the light shielding plate 32 mate with the recesses 7 in the electronic camera, whereby the light shielding plate 32 is attached to the electronic camera. The socket 20 of the electronic camera and the terminals 31 make contact so that the electronic camera is electrically connected to the liquid crystal display device 30.

When the image of a subject is to be sensed, the light shielding plate 32 is attached to the back side of the electronic camera. If the image of the subject is sensed, a video signal representing the image of the subject is obtained in the manner described above. The video signal is applied to the liquid crystal display device 30 on the light shielding plate 32 that has been attached to the electronic camera, whereby the image of the subject is displayed on the display screen of the liquid crystal display device 30.

When the rechargeable battery 24 is to be charged, the light shielding plate 32 is detached from the electronic camera. Light strikes the underside of the CCD 14, which proceeds to accumulate electric charge. The amount of electric charge that accumulates in the CCD 14 is greater now than when the underside of the CCD 14 was covered. Charging of the rechargeable battery therefore takes place with greater efficiency.

Though the light shielding plate 32 shown in FIG. 7b is provided with the liquid crystal display device 30, the light shielding plate 32 need not necessarily provided with the liquid crystal display device 30.

Figure 9:
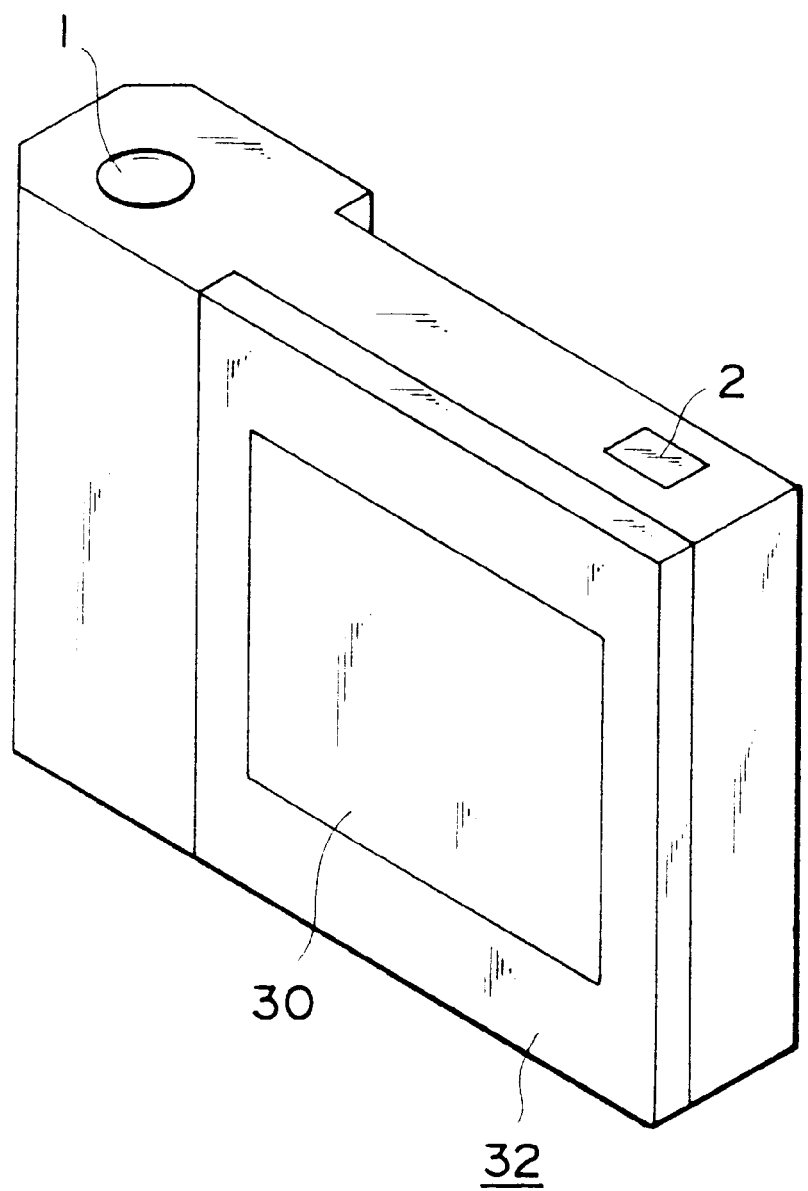
FIG. 9 is a perspective view showing the appearance of an electronic camera.

FIG. 9 shows the appearance of an electronic camera as seen from the front.

In the example illustrated in FIGS. 7a and 7b, the light shielding plate 32 is attached to the back side of the electronic camera. However, it is also possible to attach the light shielding plate 32 to the front side of the electronic camera.

By attaching the light shielding plate 32 to the front side of the electronic camera in the manner shown in FIG. 9, such components as the taking lens 11, viewfinder 25 and auxiliary light source 26 can be protected. It goes without saying that if the light shielding plate 32 is attached to the front side of the electronic camera, then the front side of the camera would be formed to have recesses for attaching the light shielding plate.

In a case where the light shielding plate 32 has been provided with the liquid crystal display device 30, the light shielding plate 32 may be attached to the electronic camera in such a manner that the display screen of the liquid crystal display device 30 is faced to the outside or to the inside of the camera. In an arrangement where the light shielding plate 32 is attached to the electronic camera in such a manner that the display screen of the liquid crystal display device 30 is faced to the outside of the camera, an image can be reproduced and the reproduced image displayed on the liquid crystal display device 30 while charging is taking place. In an arrangement where the light shielding plate 32 is attached to the electronic camera in such a manner that the display screen of the liquid crystal display device 30 is faced to the inside of the camera, the display screen of the liquid crystal display device 30 can be protected.

When the power supply is turned off in the foregoing embodiments, the diaphragm 12 and shutter 13 are opened and the taking lens 11 is controlled so as to set focus to infinity. However, in a camera devoid of a diaphragm, naturally control for opening the diaphragm is not carried out. In a camera devoid of a mechanical shutter (an electronic camera in which the image of a subject is sensed by a so-called electronic shutter, namely a camera in which shutter operation is performed by controlling readout of signal charge from the CCD 14), it goes without saying that a shutter release operation is not carried out. Furthermore, in a camera not having a focusing control capability, it goes without saying that control for setting focus to infinity cannot be performed even if the power supply has been turned off.

In the embodiments described above, the method of reading out signal charge at the time of image sensing and the method of reading out signal charge at the time of charging differ. However, the method of reading out signal charge at the time of charging may be made the same as the method of reading out signal charge at the time of image sensing. If the readout methods are made the same, then a switch for changing over the signal output by the CCD 14 would be provided and the switch would be operated so as to input the output signal of the CCD 14 to the analog signal processing circuit 15 at the time of image sensing and to the power-supply control circuit 23 at the time of charging.

As many apparently widely different embodiments of the present invention can be made without departing from the spirit and scope thereof, it is to be understood that the invention is not limited to the specific embodiments thereof except as defined in the appended claims.

What is claimed is:

1. An electronic camera equipped with a solid-state electronic image sensing device for sensing the image of a subject and outputting a video signal representing the image of a subject, comprising:

a power-supply switch for controlling a power supply to turn the power supply on and off;

a power-supply switch discrimination device for determining whether said power-supply has been turned off;

a charging circuit for charging a rechargeable battery;

a current discrimination device for determining whether a charging current obtained from a signal charge that has accumulated in the solid-state electronic image sensing device is greater than a predetermined current; and a charging control device, responsive to a determination by said power-supply switch has been turned off, for controlling said charging circuit so as to charge the rechargeable battery using the charging current if said current discrimination device determines that the charging current is greater than the predetermined current.

2. The camera according to claim 1, further comprising:
a diaphragm for limiting the quantity of light that impinges upon the solid-state electronic image sensing device; and
a diaphragm control device for opening said diaphragm in response to a determination by said power-supply switch discrimination device that said power supply has been turned off.

3. The camera according to claim 1, further comprising:
a mechanical shutter for limiting length of time during which light impinges upon the solid-state electronic image sensing device; and
a shutter control device for opening said mechanical shutter in response to a determination by said power-supply switch discrimination device that said power supply has been turned off.

4. The camera according to claim 1, further comprising:
a taking lens system for forming the image of a subject on a light-receiving surface of the slid-state electronic image sensing device;
a focusing mechanism for controlling said taking lens system so as to focus the image of the subject on the light-receiving surface of the slid-state electronic image sensing device; and
a device for controlling said focusing mechanism, in response to a determination by said power-supply switch discrimination device that said power supply has been turned off, in such a manner that the image of the subject is formed at infinity.

5. The camera according to claim 1, wherein said camera has a back side formed to include a light-transmitting window, a light shielding member is freely attachable to said window, and the solid-state electronic image sensing device has an underside that is fixed to said window via a transparent substrate.

6. The camera according to claim 5, wherein said light shielding member is equipped with a display device for displaying the image of the subject represented by the video signal output from the solid-state electronic image sensing device.

7. The camera according to claim 5, wherein said light shielding member is removably attached to the front side of the camera.

8. A method of controlling the operation of an electronic camera equipped with a solid-state electronic image sensing device for sensing the image of a subject and outputting a video signal representing the image of a subject, comprising the steps of:
discriminating whether said power-supply, which is for controlling a power supply to turn the power supply on and off, has been turned off;
determining whether a charging current available from signal charges accumulated in the solid-state electronic image sensing device is greater than a predetermined current; and
charging a rechargeable battery using the charging current in response to turning off of the power-supply switch and in response to a determination that the charging current is greater than the predetermined current.

9. The method of claim 8, wherein the step of charging the rechargeable battery further comprises:
maximizing an amount of light energy received to charge the solid-state electronic image sensing device; and
minimizing an amount of current consumed by the camera.

10. The method of claim 9, wherein the step of minimizing the amount of current consumed comprises setting the camera in a sleep mode, wherein the predetermined current is a current amount consumed by the camera in the sleep mode.

11. The method of claim 10, wherein the electronic camera includes a display and wherein the predetermined current further includes current required to display an image on the display.

12. The method of claim 9, wherein the step of maximizing the amount of light energy received comprises at least one of opening a diaphragm of the camera, opening a shutter of the camera, or setting a focus of a taking lens to infinity.

13. The method of claim 12, wherein the electronic camera includes a detachable light shielding plate and wherein the step of maximizing the amount of light energy received further comprises detaching the light shielding plate from the camera.

14. The method of claim 8, wherein the electronic camera includes a detachable light shielding plate and wherein the method further comprises attaching the light shielding plate to a front of the electronic camera for protection.

15. An imaging apparatus operable for charging a rechargeable battery, comprising:
an image sensing device;
a charging circuit configured for charging the rechargeable battery using a charging current obtained from accumulated signal charges from said image sensing device;
a charging control device configured for controlling said charging circuit such that said charging circuit charges the rechargeable battery when said imaging apparatus is inactive and said charging current is greater than a predetermined current value.

16. The imaging apparatus of claim 15, wherein said predetermined current value is a current amount consumed by said imaging apparatus in a sleep mode.

17. The imaging apparatus according to claim 15, further comprising:
a diaphragm configured for controlling a quantity of light impinging upon image sensing device; and
a diaphragm control device configured for controlling an opening of said diaphragm to a predetermined opening amount when said imaging apparatus is inactive.

18. The imaging apparatus according to claim 17, wherein the predetermined opening amount is a maximum opening amount.

19. The imaging apparatus according to claim 15, further comprising:
a mechanical shutter configured for controlling length of time during which light impinges upon said image sensing device; and
a shutter control device configured for opening said mechanical shutter when said imaging apparatus is inactive.

20. The imaging apparatus according to claim 15, further comprising:
a lens system configured for forming an image on said image sensing device; and
a lens control device configured for controlling focusing of said lens system to a predetermined focus value when said imaging apparatus is inactive.

21. The imaging apparatus according to claim 20, wherein the predetermined focus value is infinity.

* * * * *